(12) United States Patent
Emerson, III (10) Patent No.: US 6,704,305 B2
(45) Date of Patent: Mar. 9, 2004

(54) INTEGRATED DEVICE FOR INTEGRATING THE INTERNET WITH THE PUBLIC SWITCHED TELEPHONE NETWORK

(76) Inventor: Harry E. Emerson, III, Succasunna, NJ (US)

(*) Notice: Subject to any disclaimer, the term of this patent is extended or adjusted under 35 U.S.C. 154(b) by 0 days.

(21) Appl. No.: 10/176,466

(22) Filed: Jun. 20, 2002

(65) Prior Publication Data

US 2003/0008682 A1 Jan. 9, 2003

Related U.S. Application Data

(60) Provisional application No. 60/301,756, filed on Jun. 28, 2001.

(51) Int. Cl.[7] .............................................. H04L 12/56
(52) U.S. Cl. ....................................... 370/352; 370/401
(58) Field of Search ............................... 370/352, 354, 370/358, 356, 401, 466, 465

(56) References Cited

U.S. PATENT DOCUMENTS

| | | | |
|---|---|---|---|
| 5,724,412 A | 3/1998 | Srinivasan | 379/93.23 |
| 5,805,587 A | 9/1998 | Norris et al. | 370/352 |
| 5,907,547 A | 5/1999 | Foladare et al. | 370/352 |
| 5,937,041 A | 8/1999 | Cardillo, IV et al. | 379/93.25 |
| 5,995,606 A | 11/1999 | Civanlar et al. | 379/201 |
| 6,031,904 A | 2/2000 | An et al. | 379/201 |
| 6,061,347 A | 5/2000 | Hollatz et al. | 370/352 |
| 6,157,648 A | 12/2000 | Voit et al. | 370/401 |
| 6,185,194 B1 | 2/2001 | Musk et al. | 370/260 |
| 6,192,045 B1 | 2/2001 | Williams et al. | 370/352 |
| 6,233,318 B1 | 5/2001 | Pickard et al. | 379/88.17 |
| 6,243,373 B1 | 6/2001 | Turock | 370/352 |
| 6,243,443 B1 | 6/2001 | Low et al. | 379/88.17 |
| 6,272,126 B1 * | 8/2001 | Strauss et al. | 370/352 |
| 6,278,704 B1 | 8/2001 | Creamer et al. | 370/352 |
| 6,292,480 B1 | 9/2001 | May | 370/352 |
| 6,307,930 B1 | 10/2001 | Mayer | 379/215.01 |
| 6,324,280 B2 | 11/2001 | Dunn et al. | 379/230 |
| 6,327,267 B1 | 12/2001 | Valentine et al. | 370/466 |
| 6,333,931 B1 | 12/2001 | LaPier et al. | 370/385 |
| 6,381,320 B1 | 4/2002 | Creamer et al. | 379/201.1 |
| 6,490,274 B1 * | 12/2002 | Kim | 370/352 |
| 6,539,077 B1 * | 3/2003 | Ranalli et al. | 379/67.1 |
| 2001/0010690 A1 | 8/2001 | Shen | 370/352 |
| 2001/0012285 A1 | 8/2001 | Shaharabani et al. | 370/352 |
| 2001/0032234 A1 | 10/2001 | Summers et al. | 709/201 |
| 2001/0055299 A1 | 12/2001 | Kelly | 370/352 |
| 2002/0024943 A1 | 2/2002 | Karaul et al. | 370/338 |
| 2002/0041590 A1 | 4/2002 | Donovan | 370/352 |
| 2002/0057672 A1 | 5/2002 | Komuro | 370/352 |
| 2002/0057677 A1 | 5/2002 | Katzschner et al. | 370/352 |

* cited by examiner

Primary Examiner—Kenneth Vanderpuye (57) ABSTRACT

Integrated Devices enable the integration of the Internet with the Public Switched Telephone Network (PSTN). A device can place a telephone call to an Integrated Device via dialing on the PSTN and have the call consummated over the Internet via a mechanism of messaging between the associated devices and systems.

20 Claims, 4 Drawing Sheets

INTEGRATED DEVICE FOR INTEGRATING THE INTERNET WITH THE PUBLIC SWITCHED TELEPHONE NETWORK

CROSS REFERENCE TO RELATED APPLICATIONS

This application claims the benefit of U.S. provisional patent application Ser. No. 60/301,756, filed Jun. 28, 2001.

BACKGROUND OF THE INVENTION

1. Field of the Invention

The present invention relates to the Internet and the Public Switched Telephone Network (PSTN); and more specifically to combined Internet and telephony devices that are capable of integrating the Internet with the PSTN.

2. Description of the Prior Art

The Internet and the PSTN constitute discrete, independent networks from an architectural and operational perspective. Much is written about both networks, especially in terms of their architecture and operation. Consequently, the specification provided herein does not reconstruct that information other than providing general background information. The term "Internet" is commonly understood and used throughout the specification and claims in a conventional way. The Internet, in general, is an assemblage of interconnected routers that provide data transport services for server computers and user devices—typically PCs. The interconnection between routers is provided by private line data circuits, the main lines of which constitutes the Internet "backbone". Internet Service Providers (ISPs) provide access to the Internet via dial up telephone lines with modems, and via dedicated arrangements such as T-1 circuits, cable modems on cable-TV systems, and DSL (Digital Subscriber Line) service.

The Internet is designed according to the Internet Protocol (IP) which provides detailed specifications for the construction, addressing, and routing of data packets (occasionally referred to as "messages" in this document). (The term "Internet Protocol" also is used loosely to refer to dozens of related protocols that are used in the Internet.) IP addresses are expressed as a series of digits separated by "dots" (periods), in the form XXX.XXX.XXX.XXX where XXX can be a number from 0 to 255. IP addresses provide a similar function on the Internet as telephone numbers provide on the PSTN. A communication with an Internet device can be established by sending a message addressed to the IP address of that device. Every device capable of communicating on the Internet has an IP address assigned to it, either permanently, or dynamically as needed. IP addresses in some environments are replaced with a proxy address; for purposes of this document, the term "IP address" shall refer to an actual IP address, or a proxy or other identifier translatable into an actual IP address. In some arrangements proxies or agents act on behalf of a client system and substitute the proxy's IP addresses for the addresses of the client devices—in these arrangements the combination of the proxy address and the original client system address resolve to provide a unique IP address for each client system. Internet data packets contain the IP address of both the sending system and receiving system (the source and destination, respectively). Since IP messages always contain the IP addresses of both the sending and destination device, when a device receives an Internet message from a sending device, it will then possess the IP address of the sender and can send messages in reply. The two devices can then engage in a communication across the Internet since each has the IP address of the other.

Routers have internal tables that provide routing instructions which relate IP addresses to the available data circuits and access lines. A router functions by reading the destination address in a data packet, and then forwarding the data packet on one of its data circuits or access lines according to the rules of the routing tables. A data packet gets forwarded from one router to another, pinballing its way across the Internet until it reaches a router that is connected to the destination system.

The term "Public Switched Telephone Network", or PSTN, as used herein means the national and international telephone network, actuated when a user dials a telephone number associated with any other phone, causes it to ring, and if answered, is enabled to carry on a voice communication (or, more properly, a "voice grade" communication) with the person (or system) at the remote location. Just as the Internet is comprised of an aggregation of interconnected routers, the PSTN is comprised of an aggregation of interconnected local and long distance telephone switching systems. The local switching systems, referred to as telephone company (telco) central offices (CO), provide telephone subscriber services in a geographic area.

As used herein, the term "telephone central office switching system" refers generically to a class of systems, typically owned by the operating telephone company in any given area, which provide "local" telephony services to telephone subscribers in that area. Generally, the operating telephone company provides the "local loop" cabling and wiring from its central office to the physical location of each of its subscribers (a "telephone circuit", or a "line"). A telephone central office might house several switching systems of this class, each serving up to 100,000 subscribers or more. The central office represents the hub of a wheel having thousands of spokes, each spoke being a physical pair of wires providing telephone service to a subscriber in that area. Subscribers in any given area are provided service by the central office situated in the center of the area. Outside that area the wires home to other similarly situated central offices. The telephone company connects the telephone circuit of a subscriber to an access connection on the switching system, and assigns a telephone number to that circuit. In operation, the switching system (or just "switch") provides battery voltage on the phone line, sends dial tone to the subscriber line when the subscriber's phone goes off hook, receives the dialed digits, and then routes the call according to its internal instructions based on the called number.

Common manufactured switching systems of this class include the Lucent Technologies 5ESS, and the Nortel DMS100. All telephone central office-switching systems around the world are interconnected by "trunk" circuits that carry voice or voice grade telephone calls between systems, and most (if not all) such systems are also interconnected by a messaging network referred to as CCS/SS7 (Common Control System/Signaling System 7), or just SS7. Long distance calls to telephones outside of the area served by the local telephone company are typically routed to a long distance carrier, such as AT&T, MCI, or Sprint in the USA. The telephone central office switches connect via trunking and messaging circuits to a class of switching system referred to as a "toll switch", such as the Lucent Technologies 4ESS, operated by a long distance carrier. Toll switches normally do not provide local telephone services.

In the current state of the art there are two inter-related messaging systems utilized within the PSTN. These are: (i) SS7; and (ii) ISDN (Integrated Services Digital Network), which incorporates a messaging system as an element of a broader product and service architecture. The SS7 messaging system extends through the major elements and systems of the PSTN, connecting virtually all of the local and long distance central offices, and carries call management (or call control) messages relating to call setup and disconnection and similar call management functions. Whereas the SS7 messaging system is oriented toward providing messaging communications among and between the PSTN switching systems, the ISDN messaging system is oriented toward extending the PSTN messaging system to the end devices such as telephones and office telephone systems. Rather than going off hook and drawing dial tone from the local central office switching system to initiate a call, as analog phones do, an ISDN phone sends a packetized digital call setup message to the switching system to initiate a call. Both the ISDN messaging system and the SS7 messaging system are based on the X.25/X.75 communications protocols. ISDN messages are carried on the SS7 messaging network. Disadvantageously, neither the SS7 nor the ISDN messaging systems carry any messages related to creating an Internet communication by one device dialing the telephone number of another.

The ISDN and SS7 messaging systems are call setup and call management (or call control) systems which carry a spectrum of messages, message responses, message acknowledgements, and the like, such as are necessary to conduct telecommunications. A full listing of all the message types that might be employed in a robust telecommunications environment has not been attempted herein, since that depth of information is not necessary to convey the essential elements of this invention. A brief listing of those message types include: (i) call setup request messages which convey dialing and associated information; (ii) busy signal messages telling the calling device to deliver a busy signal to the user; (iii) audible ring back messages telling the calling device to deliver "pacifier" ringing to the user; (iv) call request acceptance or rejection messages (v) call connect messages; (vi) call disconnect messages; (vii) switchhook flash messages; (viii) call transfer request messages; (ix) call conference messages; (x) call waiting messages; (xi) Caller-ID and Call Waiting-ID messages; and (xii) call forwarding messages to redirect a call to another device. In addition to these messages, a variety of other messages would be employed to indicate information like "network busy", "invalid telephone number dialed", and the like.

In an associated matter, there are now a variety of technologies that provide both Internet and PSTN connectivity. These technologies include: (i) Voice over IP (ii) DSL service; (iii) cable modem service delivered by cable-TV systems; (iv) fixed wireless systems; and (v) Internet capable cellular wireless systems.

In one aspect, the systems described herein relate to Voice over IP service. The term IP refers to the "Internet Protocol", the basic protocol of the Internet, while the term Voice over IP refers to sending digitized voice across the Internet using the IP protocol. Several companies provide discount rate phone calls using "Voice over IP" (VOIP) technology, wherein a long distance call of a client, typically a Personal Computer (PC) user, is carried over the Internet to a VoIP interface device in the vicinity of the called party. Such VoIP technology avoids the charges associated with placing a long distance call with a traditional long distance carrier. The VoIP interface device dials a local call on the PSTN to complete the connection for the VoIP client. Hence, the call travels partially over the Internet and partially over the PSTN as an analog call. A VoIP software application at the client device digitizes the user's voice and sends that as data messages across the Internet to the VoIP interface device. The VoIP interface device in turn converts the data messages to analog signals that are output onto the analog phone line. In the reverse direction, the VoIP interface device receives analog signals from the dialed phone and converts those analog signals to digital messages which it sends across the Internet to the VoIP client. The VoIP software at the client converts those digital messages to analog signals which are output to the user via speakers.

In another aspect, the systems described herein relate to an Internet access technology currently being deployed that is referred to as DSL (Digital Subscriber Line) service. (The original acronym was ADSL, for Asynchronous Digital Subscriber Line.) Although there are some variations on the technology (now generically referred to as "xDSL"), it essentially involves an analog telephone line supplemented by a high frequency carrier signal superimposed on the telephone line by a pair of modems—one at the subscriber location, and one at the telephone company central office. The DSL carrier signal can carry high-speed data concurrently over the same phone line without interfering with the analog phone service. Other than being carried by the same physical wires, the phone line has no relationship to the DSL Internet service.

In another instance, the matter to be discussed relates to virtual phone service provided via cable TV. Cable TV service has been used to provide high-speed Internet access—the popular "cable modem" service. In addition, there are a number of current activities related to delivering alternative provider telephone service via the cable TV distribution system. Similar to the Internet access service arrangement, the telephony service arrangement utilizes a "cable modem" to transmit and receive voice grade telephone calls. Other than being carried by the same physical cable, telephone service provided by cable TV has no relationship to the cable modem Internet service.

A related matter is that of virtual phone service provided by the so-called fixed wireless arrangement, currently undergoing field trials in some areas, and by the newly introduced cellular telephone service with Internet access. Although these are substantially different services from a user perspective, the wireless infrastructure is much the same.

In each of these technologies, even though they provide both Internet and PSTN connectivity, the Internet aspect is separated from the telephony aspect. Furthermore, none of these technologies enables one device to create an Internet communication with another device simply by dialing its telephone number.

Conventional communication vehicles comprise computers and telephones. Computers typically have telephone lines attached to them, and telephones oftentimes have computers attached to them; but there is no true integration that enables the blending of the Internet and the PSTN. The level of integration that is presently attained permits a computer to use a phone line to dial into the Internet. Once on the Internet, the computer can access another computer by entering its Internet Protocol (IP) address into application software such as a browser.

Figure 1:
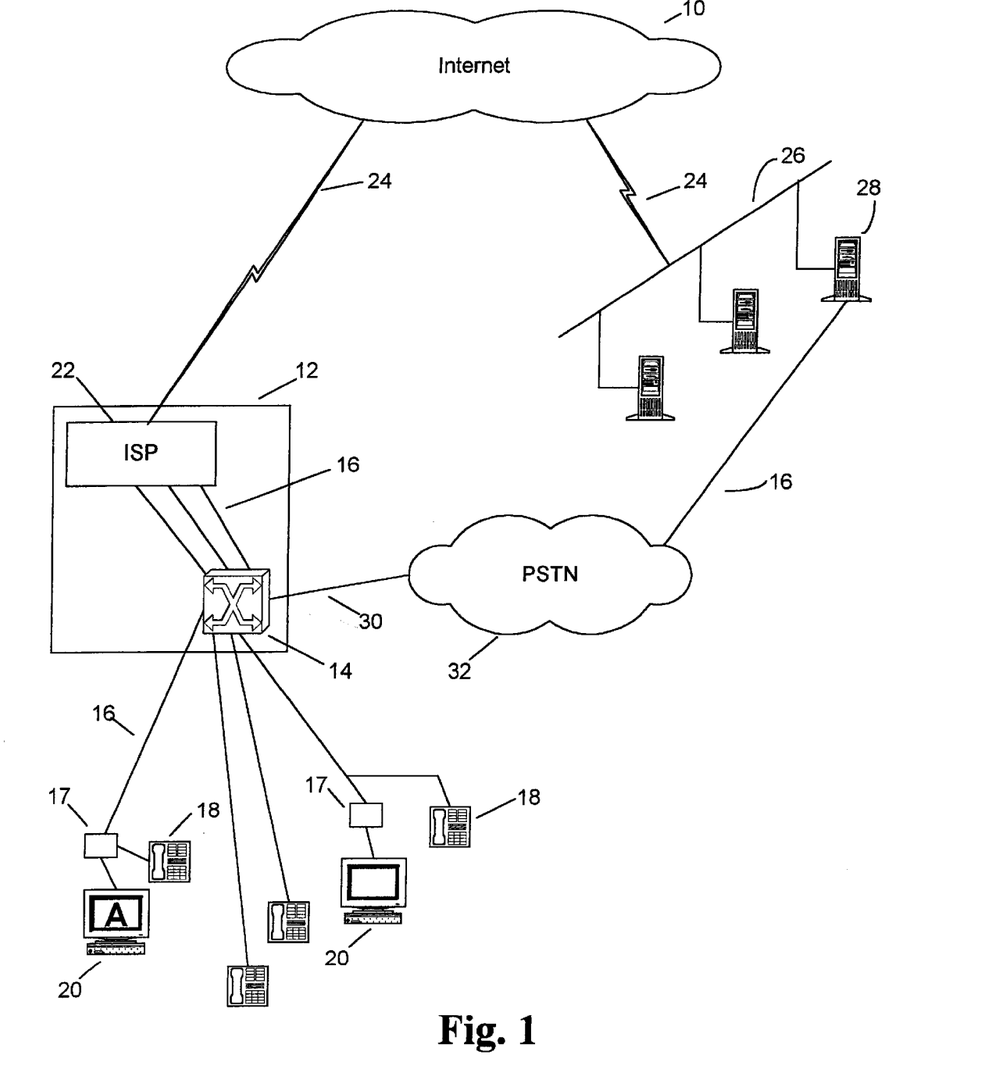
FIG. 1 is a schematic diagram illustrating a conventional arrangement for use of Internet and telephony devices.

Referring to FIG. 1, there is shown the manner by which today's inferior level of integration is achieved. The Internet 10 has two kinds of devices connected to it; dialup computers, and servers attached via high speed dedicated Local Area Network (LAN) connections, as follows. Telephone company (telco) central office 12 incorporates a switching system 14 which provides telephone lines 16, some of which provide residential and business local service, such as for phones 18. Some phones 18 are associated with modems 17 and Personal Computers (PCs) 20. Other of the phone lines 16 connect to a Terminal Server device 22 provided by an Internet Service Provider (ISP), which has an internal modem (not shown)for each telephone line. The Terminal Server concentrates the traffic from the dial up subscribers onto a multiplexed access line 24, commonly a T-1 line, thereby providing Internet access to these subscribers. Telco central office also has communications to other telco central offices via multiplexed messaging communications links 30. The aggregation of interconnected central office switching systems constitutes the PSTN 32 in the same fashion that an aggregation of interconnected routers constitutes the Internet. Server computers 28 reside on a LAN 26, also having a multiplexed access line connection 24 to the Internet.

Operationally, user computers 20, via attached or internal modem 17 seize associated telephone line 16 and dial the telephone number assigned to them by their ISP, and thus ring the phone line 16 connected to Terminal Server 22. An internal modem in Terminal Server 22 answers the phone call, and via a protocol exchange, creates a logical link for computer 20 to access the Internet 10. The user, by entering the IP address of a server 28 into a software application like a browser, is then able to connect via the Internet to that server to access whatever services it has to offer.

However, a user might know the telephone number of an organization (a local pizza shop, for example), and not know their Internet address. It would therefore be advantageous to be able to dial that phone number and connect to that organization's Internet service via the Internet. Unfortunately, there is no condition under which a computer 20 could create an Internet connection to a server 28 by dialing a phone number. For example, let's assume that a server 28 has a telephone line connection 16 to the PSTN 32, and assume that it offers a direct dial-in service via telephone line 16. By dialing the telephone number associated with telephone line 16, the user computer 20 would be directly connected to the server, and not connected to the Internet. By comparison, if user computer 20 dialed into the ISP connection as previously described, from that single connection the user computer could create and maintain very many simultaneous connections with servers around the world, taking advantage of the hyperlinking that can bounce a connection from one server or service to another. Each such connection is established directly between the user computer 20 and the remote server, without there being a server computer in the middle. But if user computer 20 dialed directly into server 28, the only way that user computer 20 could access the Internet would be by using the server 28 as a gateway. Even still, Internet servers are not designed to provide this kind of direct dial-in service, as it defeats in large measure many of the advantages that Internet connections offer.

In addition, it would be desirable for a user computer such as 20 to be able to dial the phone number of an organization such as a local pizza shop and thereby be able to conduct voice, data, audio, and video communications with them over the Internet. That capability does not exist in the prior art.

In view of the aforenoted communication deficiencies, there remains a need in the art for a method and means for accessing Internet services, and conducting voice, data, audio, and video communications, via the Internet, by dialing a telephone number.

SUMMARY OF THE INVENTION

The present invention provides a method and means for enabling an Integrated Device to access Internet services and conduct voice, data, audio, and video communications with another device, system, or service, over the Internet, by dialing the telephone number of that other device, system, or service. As used herein, the term "device" includes systems, services, appliances, and similar apparatus useable for these purposes. For example, Integrated Devices include Internet capable wireless cellular handsets.

The Integrated Devices described herein are especially suited for use with the method and means described in my co-pending application entitled "Integrating the Internet with the Public Switched Telephone Network", Docket No. 0054-4, filed of even date herewith, and augment that invention by describing the characteristics of devices optimized to facilitate integration of the Internet with the PSTN.

Devices for integrating the Internet with the PSTN ("Integrated Devices") have both an Internet connection and a telephone number. The Internet connection is associated with an IP address. In some arrangements, such as over cable-TV systems and wireless systems, the IP address may be indirectly associated with the Integrated Device. For example, in a wireless handset arrangement, the provider's complex might provide Internet connections for wireless handsets on a proxy basis wherein the complex keeps track of IP number assignments used for each handset, but communicates with each handset based on a serial number or other unique identifying scheme. The same goal is accomplished, i.e. an Internet capable handset gets its own IP address, but with one level of indirection.

Integrated Devices have a telephone number and telephone (PSTN) connectivity, but not necessarily a standard telephone line as a number of techniques have been developed to provide virtualized telephone lines. Integrated Devices may have a direct connection to the PSTN such as by being directly connected to the serving telco Central Office, or may have an indirect connection such as by being connected to an intermediate device such as a PBX (Private Branch Exchange) which, in turn, is connected to the serving Central Office.

Beyond basic telephone connectivity to the PSTN, Integrated Devices have a digital messaging capability to the PSTN. The PSTN utilizes a digital messaging system called SS7 to carry call control related messages between telephone switching systems; in addition, the telecommunications technology ISDN provides a digital messaging capability for carrying similar call control messages between telephone systems and devices. The digital messages of ISDN include call setup messages which carry the calling and called telephone numbers to establish a call, messages to initiate and stop ringing at the called device, call teardown messages, and so on. The messaging communications capability of Integrated Devices might therefore use or be based upon one of these existing technologies. The purpose of the messaging is to provide calling and called Integrated Devices adequate information to conduct a communication between themselves over the Internet when that communication was started by one device calling the telephone number of the other device.

Messages sent on the Internet using the Internet Protocol incorporate the IP address of both the sender and the receiver (the source and the destination) in every message (called a "packet"). Thus, when one device initiates an Internet communication to another device by sending an Internet message to that other device, the receiver automatically learns the IP address of the sender, and a two-way communication can commence.

An Integrated Device can connect to another Integrated Device by dialing the associated telephone number on the PSTN. Similarly, an Integrated Device can communicate with another Integrated Device over the Internet by sending an Internet data message addressed to the IP address of the other Integrated Device. The Integrated Device has the ability to send and receive digital messages from both the Internet and the PSTN carrying call setup, telephone number, and IP address information. And, it incorporates software, firmware, or other operational logic to perform the integration functions.

The integration functions include the ability to dial a phone number on the PSTN, receive a digital message from the PSTN as to how to conduct the requested connection over the Internet, and then to perform whatever processes are necessary to establish that Internet connection. Some calls will be directed to analog devices not capable of an integrated Internet/telephony communication—in that situation, the Integrated Device functions compatibly with the analog aspects of the PSTN.

In the reverse direction, an Integrated Device that receives a call setup message responds accordingly in establishing an Internet connection—both the calling and called Integrated Devices work cooperatively in this process. Once an Internet connection is established with another Integrated Device, the devices may elect to conduct any part of their communication over the Internet, or over the telephone line. In some applications it might be best to conduct all of the communications over the Internet and abandon the PSTN portion of the connection; in other applications it might be desirable to maintain the PSTN connection, perhaps for voice purposes, and conduct the remaining communications over the Internet. The devices could also determine to abandon the Internet portion of the connection and continue in another mode, such as by communicating entirely over the PSTN.

Call handling resources of an Integrated Device include physical or virtual line appearance buttons, the number of simultaneous calls to be accepted by the device, and the bandwidth available to communications. These parameters may be determined by physical constraints of the device, or may be configurable by the user or system provider. The messaging system of Integrated Devices extends across the Internet, or across any other medium such as a wireless arrangement, between the calling and called devices, and extends on the PSTN between the device and the local serving central office switch. Specifically, this invention provides the capability for an Integrated Device having both an Internet connection and a PSTN connection to convey messages across both media appropriate to place and receive calls and manage its own call-handling resources. Messages received by Integrated Devices from calling devices on either the Internet or the PSTN include call setup request messages, Caller-ID messages, Call Waiting messages, and Call Waiting-ID messages, among others. Response messages from the called Integrated Device include accepting calls, rejecting calls due to a busy condition, forwarding calls to another number or device, and the like.

In further defining an Integrated Device, one can imagine that various applications would determine its full characteristics. For example, let's assume that the pizza shop was only interested in receiving integrated Internet/telephony calls, and does not wish to use their Integrated Device for calling other Integrated Devices with the intent of creating an Internet connection. In this application, there may be no need for the pizza shop Integrated Device to have a display screen. A residential user, however, wishing to call the pizza shop and create an Internet connection would want a multimedia terminal, including a display screen, speakers, and microphone.

In another variation, an Integrated Access Device could be achieved by application software running on a PC that has only an Internet connection wherein the PC is used for calling to create an Internet connection, but could not be called to create an Internet connection. For example, office PCs on a LAN with access to the Internet, but not having individual phone lines, might have this arrangement.

From a general design perspective, there already exists a worldwide implementation of ISDN systems (Integrated Services Digital Network), which incorporate a PSTN and a peer-to-peer messaging capability that would be suitable for the messaging requirements of the Integrated Devices. Therefore, Integrated Devices would be advantageously designed if compatible with ISDN in that they could more readily communicate with ISDN systems, and ISDN systems may require less modification to incorporate Integrated Device capability.

There also exist a variety of DSL (Digital Subscriber Line) services which provide a subscriber's system with digital communications capability. DSL connectivity is typically arranged with an ATM (Asynchronous Transport Mode) lower layer protocol conveying Ethernet or IP data traffic. Such an arrangement would be suitable for the digital messaging requirements of the Integrated Devices.

In addition, there is a simplistic messaging technology that has found modest success, referred to as ADSI (Analog Display Screen Interface), which is an outgrowth of Caller ID. ADSI provides 1200 bit per second modem communications messaging between a telephone central office and an analog ADSI phone, or between two ADSI phones, one acting as a server. The messaging is interruptive, in that modem connections use the voice frequency band and so, at any moment, an analog telephone line can carry either a voice conversation or an ADSI modem connection, but not both. The data rate is also very slow, and so has limited applications. Nevertheless, since Caller-ID, Call Waiting ID, and some other services have been implemented using ADSI, it would be advantageous for Integrated Devices to be compatible with ADSI. The utility might be limited, but might be suitable for some purposes, products, price ranges, and the like.

This invention, then, provides Integrated Devices which integrate the Internet and the PSTN by creating Internet connections by dialing a telephone number on the PSTN.

BRIEF DESCRIPTION OF THE DRAWINGS

The invention will be more fully understood when reference is had to the following detailed description of the preferred embodiment of the invention and the accompanying drawings, in which.

DETAILED DESCRIPTION OF THE INVENTION

The Integrated Devices herein described are devices for integrating the Internet with the PSTN by enabling an Integrated Device to dial the telephone number of another Integrated Device and thereby create an Internet communication with the dialed Integrated Device. An Integrated Access Device can dial an Integrated Device to create an Internet communication, but cannot be dialed to do so.

Central to the principles and practice of this invention, as well as the inventions described by the co-pending patent applications, is the presence of means for enabling a calling device to create an Internet communication with another device simply by dialing its telephone number, thus integrating the Internet with the PSTN. The co-pending patent applications describe various aspects of this integration. One benefit of such integration is that traditional voice-only telephone calls can be augmented or replaced with multimedia communications using Internet protocols and capabilities. Such multimedia communications may include: voice and other audio; graphics, images and other visual material; motion video; and synchronized audio and video transmitted together including TV video and videophone service. The data for these multimedia communications may be transmitted on the Internet as a result of the integration described herein. The enhanced capabilities provided by the present invention further facilitate that integration.

The following provides an overview of the co-pending patent applications.

Co-pending application entitled "Integrating the Internet with the Public Switched Telephone Network", Ser. No. 60/301,757, Attorney Docket No. 0054-4, discloses an enhanced communications environment in which a telephone call placed to an Integrated Device can create end-to-end communications over the Internet rather than partially or exclusively over the PSTN.

There exists a class of devices, such as those for Voice over IP, DSL, cable TV, fixed wireless, Internet capable wireless cellular, and similar distribution systems, which provide Internet and telephony services to client devices, such as phones and PCs, by providing an interface to the telephone company central office switching system. Co-pending application entitled "Telephone Central Office Switch Interface With Messaging Channel For Integrating The PSTN With The Internet", Ser. No. 60/301,758, Attorney Docket No. 0054-5, discloses a method and means for providing specific messaging capabilities between a telephone central office switching system and this class of interface device, enabling the integration of the Internet with the PSTN. The communications link carries call setup, telephone number, and IP address messages to and from the switching system and to and from the client devices of the interface device.

Co-pending patent application entitled "Telephone Switching System For Integrating The Internet With The Public Switched Telephone Network", Ser. No. 60/306,294, Attorney Docket No. 0054-7, discloses a method and means for a telephone central office switching system to enable a calling device to establish an Internet communication with a called device by dialing its telephone number.

Co-pending patent application entitled "Integrated Telephone Central Office Systems For Integrating The Internet With The Public Switched Telephone Network", Ser. No. 60/306,293, Attorney Docket No. 0054-8, discloses an integrated assembly of telephone central office switching system integrated interface devices, comprising telephone central office switching systems, and switching system interface devices such as those for providing DSL service, Voice over IP (VOIP) service, cable modem service, fixed wireless service, and Internet capable cellular wireless service. The integrated telephone central office systems therein described offers efficiencies and economies further benefiting the integration of the Internet with the PSTN.

A messaging system such as that specified in the co-pending patent application entitled "Call Management Messaging System For Integrating The Internet With The Public Switched Telephone Network", Ser. No. 60/311,401, Attorney Docket No. 0054-9, exchanges call management messages such as call setup requests, call disconnect messages, Call Forwarding messages, and so on, between communications systems and user devices, either being connected to the Internet, the PSTN, or to both.

Co-pending patent application entitled "Interactive Device Control System. For Integrating The Internet With The Public Switched Telephone Network", Ser. No. 60/317,055, Attorney Docket No. 0054-11, discloses a system for the PSTN and the Internet in which a communications system offers the user of a device such as a screen phone the ability to control or influence functions of the communications system by presenting the user with a displayed menu of options. The menu of options is sent to the user's device by the communications system via a messaging system. Selection of an option by the user returns a response message to the communications system via the messaging system. Upon receipt of the response message, the communications system actuates the function associated with the user-selected option. The interactive device control system operates seamlessly across both the Internet and the PSTN, thus providing further integration of those two networks.

Co-pending patent application entitled "Stored Profile System For Storing And Exchanging User And System Communications Profiles To Integrate The Internet With The Public Switched Telephone Network", Ser. No. 60/317,057, Attorney Docket No. 0054-12, discloses a system for the PSTN and the Internet to maintain and exchange communications related information such as hardware capabilities and personal information and preferences. The Stored Profile System enables devices to synchronize and optimize their communications capabilities, and enables users to exchange contact information such as Electronic Business Cards as a part of call setup, operating like an enhanced Caller-ID. The stored profiles capability extends to communications systems on both the PSTN and the Internet, thus further promoting the integration of the Internet with the PSTN.

Central to the principles and practice of this invention, as well as the inventions described by the co-pending patent applications, is the presence of means for enabling a calling device to create an Internet communication with another device simply by dialing its telephone number, thus integrating the Internet with the PSTN. The co-pending applications describe an environment in which the various elements of the PSTN are enabled to conduct digital, packetized messages, which communicate essential information between various devices across the Internet and the PSTN to provide for this integration. Although not limited to the scope of the following listing, these enabled PSTN elements include: (i) the end or terminal devices such as telephones and Integrated Devices; (ii) telephone central switching system interface devices, such as those for VoIP, DSL, cable-TV, and the like, which provide telephony and Internet services for client devices; (iii) telephone central office switching systems which provide telephony services for client devices; (iv) telephone long distance switching systems which provide long distance capabilities on the PSTN; (v) office telephone systems such as PBXs, Key Systems and the like; and, (vi) adjunct devices such as automated attendant systems, automatic call distributors, voice mail systems, and the like.

Some of these devices, including the end or terminal devices, are uniquely addressable within the messaging system via an IP address, telephone number, or other identifier associated with the device. Other identifiers could include an internal system reference (e.g., module, cabinet, shelf, slot, port number), an ISDN (Integrated Services Digital Network) address, or the like. Regardless of the nature of the address, Integrated Devices have messaging addresses known to the serving system such as a telephone central office switching system, telephone central office switching system interface device, office telephone system, and the like, such that the serving system can communicate with the Integrated Devices via the messaging system.

The messaging system common to this invention and the inventions of the co-pending patent applications connects between each of these devices and systems, and the messages of which the messaging system is comprised are transmitted to and between each of these devices as are necessary for any individual communication. Some devices and systems may simply act as a pass-through for the message stream by passively or actively forwarding messages, or may act as a pass-through for specific message types while acting upon others. Each device or system may send, receive, forward, or act upon any given message as is necessary to accomplish the message functions. Messages may be sent in one or more pieces from one device to the next, and devices may assemble, reformat, re-packetize, augment a message with additional data, or otherwise manipulate a message as is processed through the system.

The co-pending applications described hereinabove provide reference information useful in developing a full understanding of the present invention as it relates to these systems and devices. Accordingly, the disclosure of each aforementioned co-pending application is incorporated herein by specific reference thereto.

Certain enhancements over the co-pending patent applications are herein described.

Figure 2:
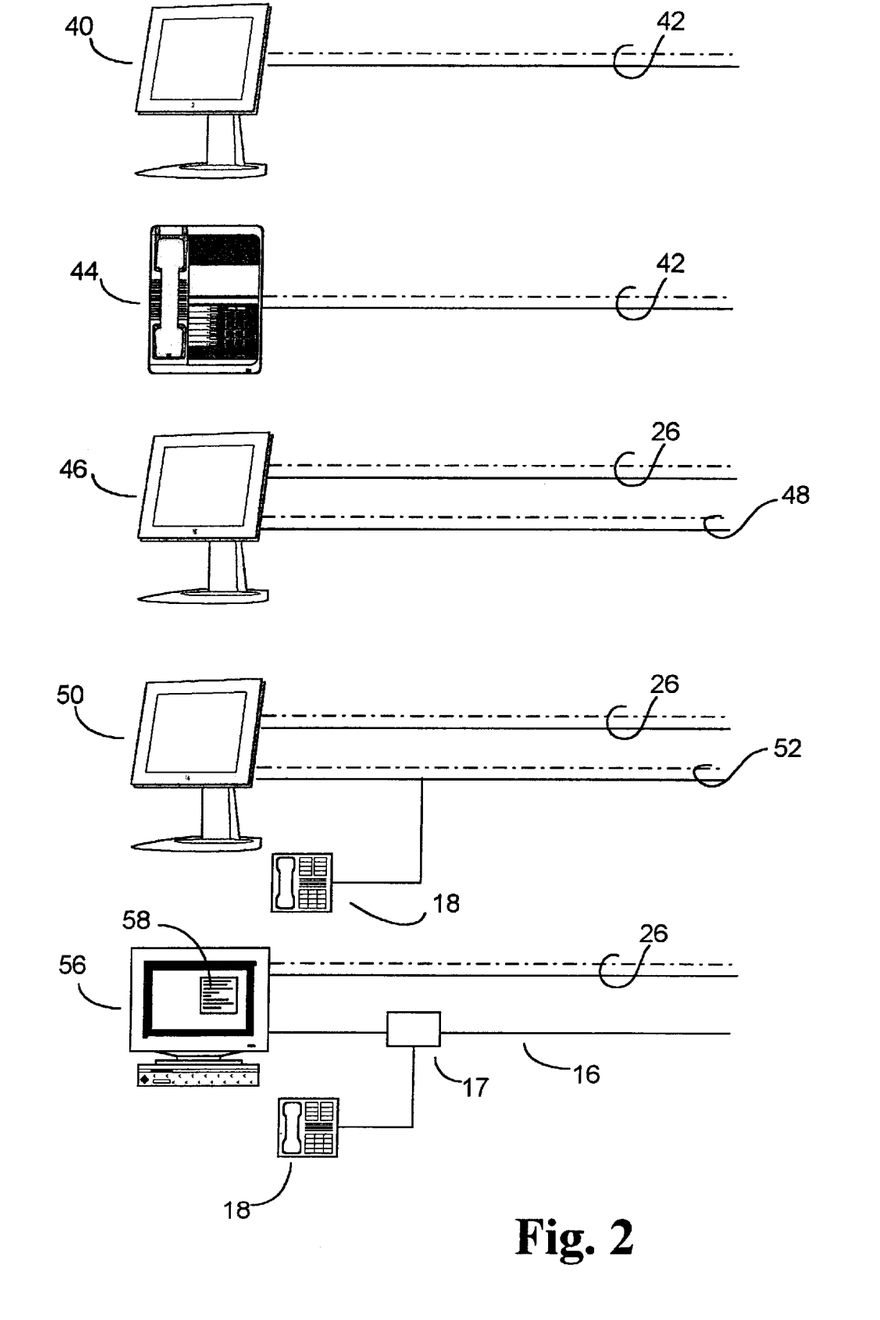
FIG. 2 is a stylized illustration depicting a variety of different types of Integrated Devices of the present invention.

FIG. 2 suggests some of the possible ways in which Integrated Devices and Integrated Access Devices might be implemented. Item 40 is an Integrated Device having a single connection providing both Internet and telephony communications 42, including the ability to send and receive digital call setup and call control messages which incorporate telephone number and IP addresses. Such a connection might be provided by a cable-TV access arrangement, a DSL access arrangement, an ISDN arrangement, a wireless cellular arrangement, a fixed wireless arrangement, a "pure packet" PBX connection, among other alternatives. Systems for providing these arrangements that are designed according to the co-pending patent applications will provide integrated high-speed packetized services including a packetized PSTN connection carrying packetized voice and other communications, a packetized Internet connection, and a packetized messaging connection. These integrated services will all be transported over the same medium, interleaving data of the various types. Thus, for example, a DSL connection as just described would offer these integrated services via the carrier frequency transport mechanism.

Integrated Device 44 has similar connectivity to Integrated Device 40, but is one of a variety of devices having no display screen, with the application of being a provider of Internet services rather than being used to call other systems for Internet services. For example, Integrated Device 44 might be the Integrated Device at the local pizza shop discussed previously. Integrated Device 46 is similar to Integrated Device 40, but has a separate Internet connection 26, such as in a LAN environment. In addition, Integrated Device 46 is provided with a telephony connection 48 capable of sending and receiving digital call setup and call control messages that incorporate telephone number and IP addresses, such as might be provided by an ISDN phone line. Integrated Device 50 is similar to Integrated Device 46, having the same Internet connectivity 26, but additionally has an analog telephone line 52 equipped with ADSI messaging and, optionally, an analog telephone 18. Lastly, Integrated Access Device 56 has either or both of a LAN connection 26 and a dialup modem capability 17 on an analog telephone line 16 with an attached analog phone 18, neither of which arrangements provide a digital messaging capability to the PSTN. Integrated Access Device 56 incorporates a software application 58 capable of initiating, but not receiving, an integrated Internet/telephony call.

Figure 3:
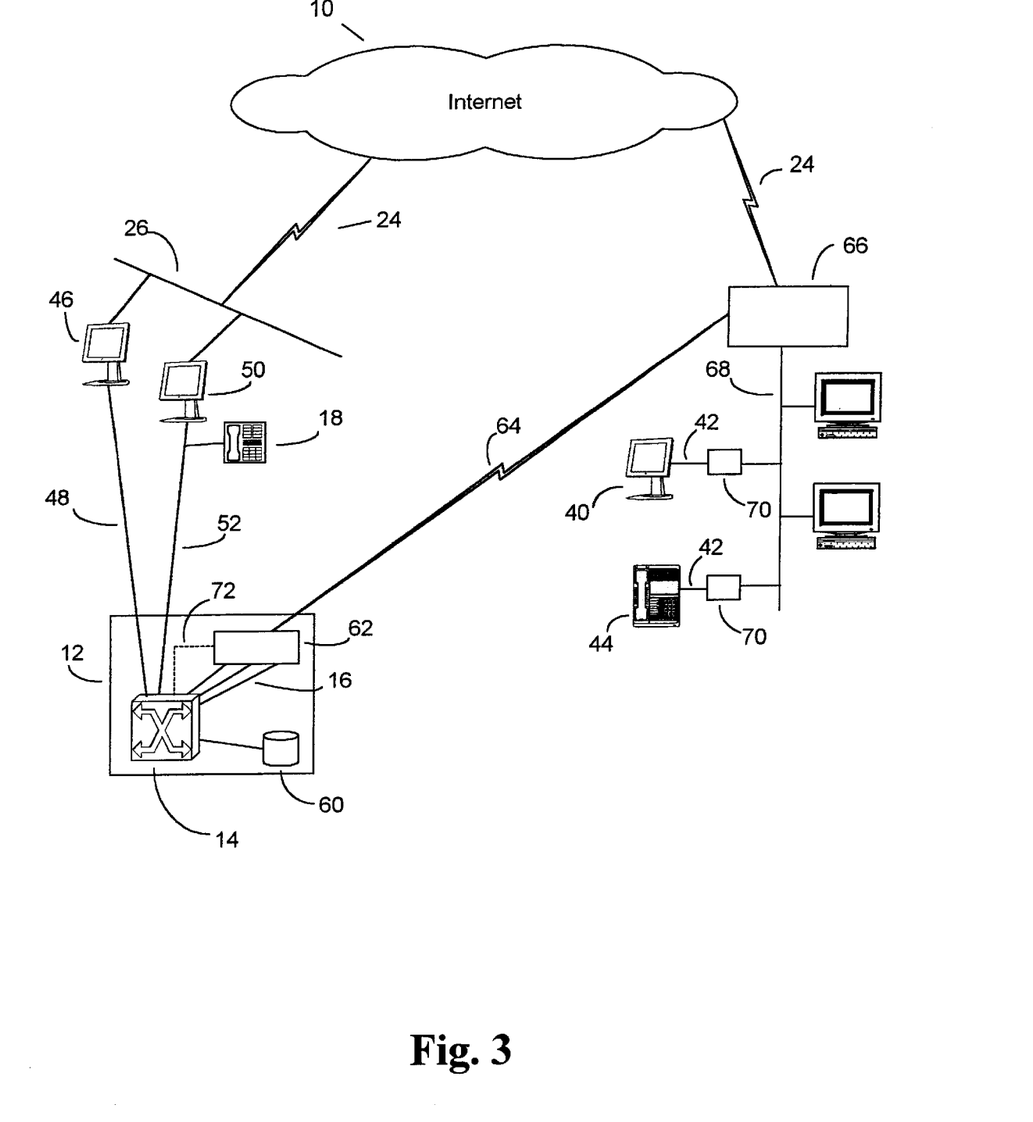
FIG. 3 is a schematic diagram in which the different types of Integrated Devices depicted in FIG. 2 are shown having connectivity in an operational setting.

In FIG. 3 the Integrated Devices of FIG. 2 are illustrated schematically in settings suggestive of the manner in which they might be implemented. As shown, the Internet 10 is connected to by access lines 24 for a LAN 26, and for a cable-TV distribution system hub 66. The cable system has an interface device 62 housed in telephone central office 12 with a multiplexed data link 64 connecting to hub 66; interface device 62 also connects to switching system 14 by a digital messaging link 72 for the purpose of sending and receiving call setup messages between the two systems. Emanating from hub 66 is a cable 68 feeding a string of workstations, each having a cable modem 70. On this string are Integrated Device 40, and 44, each also having an Ethernet connection 42 to the cable modem 70. The central office 12 also incorporates a telephone switching system 14, which has service records 60 available to it which maintain a record of telephone number and IP addresses for its subscribers of Integrated Devices. Switching system 14 has analog phone lines 16 connecting to the cable-TV interface device 62. Integrated Device 50 resides on LAN 26 having access line 24 to the Internet, and has analog phone 18 associated with analog phone line 52 from telco switching system 14. Analog phone line 52 incorporates ADSI (Analog Display Screen Interface) messaging capability. Integrated Device 46 has an ISDN connection 48 to switching system 14, and also has LAN connectivity 26 to the Internet.

Operationally we can see how these devices operate by again referring to FIG. 3. Assume that device 46 places a PSTN call to device 40 or 44. In one arrangement, Integrated Device 46 sends a digital call setup message to its serving central office switching system 14, said message including its own telephone number and the called telephone number. Switching system 14 retrieves from its service records 60 the IP address associated with the calling device, and forwards the call setup message now incorporating the IP address to the cable-TV system interface device 62 via messaging link 72. Interface device 62 forwards the message across the multiplexed communications link 64 to the distribution hub 66, which sends it down the cable 68 to the destination device (either 40 or 44). The destination device, now having the call setup message containing the IP address of the caller, sends a digital message across the Internet to the caller, as follows: the message travels the reverse direction up cable 68 to hub 66, which delivers it to access line 24 onto the Internet. The Internet message pinball's through the Internet until it arrives at the caller device 46, whereupon 46 and (40 or 44) commence an Internet communication. The two devices at that time decide which portions of their communication to transpire over the Internet, and which to transpire over the PSTN, and manage that transaction with appropriate subsequent messages.

In another arrangement, Integrated Device 46 sends a digital call setup message to its serving central office switching system 14, said message including its own telephone number and the called telephone number, and also including its own IP address. The process continues as in the previous description with the exception of omitting the step wherein switching system 14 retrieves the IP address associated with the calling device from its service records. Other operational arrangements and methods are also possible.

Other communications transpire similarly. For a call initiated by a device on the cable-TV system, we would assume that the cable-TV system maintains service records of its client devices having telephone numbers associated with IP addresses; these service records may be maintained in the interface device 62, in the distribution hub 66, or at some other convenient location (service records not shown). Assuming that the service records are maintained by the distribution hub 66, a call setup request message from a client on the cable would have the client device's IP address added to the call setup message, and then sent to the telco switching system 14. The rest of the process continues to follow in reverse. Let's assume that Integrated Device 40 dialed the number for Integrated Device 50. The call setup message would be relayed from the switching system 14 via an ADSI messaging system on the analog phone line 52 to device 50 in a process similar to delivering Caller-ID. Integrated Device 50, now having the IP address of the caller, then sends an Internet message to Integrated Device 40 via access line 24 to complete the communication over the Internet.

Due to the diversity of systems and methods of operation in the Internet and the PSTN, other arrangements and methods of operation are possible for Integrated Devices within the scope of this invention. For example, the PSTN, may notify either or both of the calling or called Integrated Devices of the other device's IP address, such notification being sent by a digital message. As another example, in some arrangements IP addresses information may be communicated directly between Integrated Devices via the PSTN messaging capability. As a further example, an element of the PSTN may have Internet connectivity which could be used for the delivery of these digital messages, rather than delivering them by a digital messaging capability of the PSTN.

Figure 4:
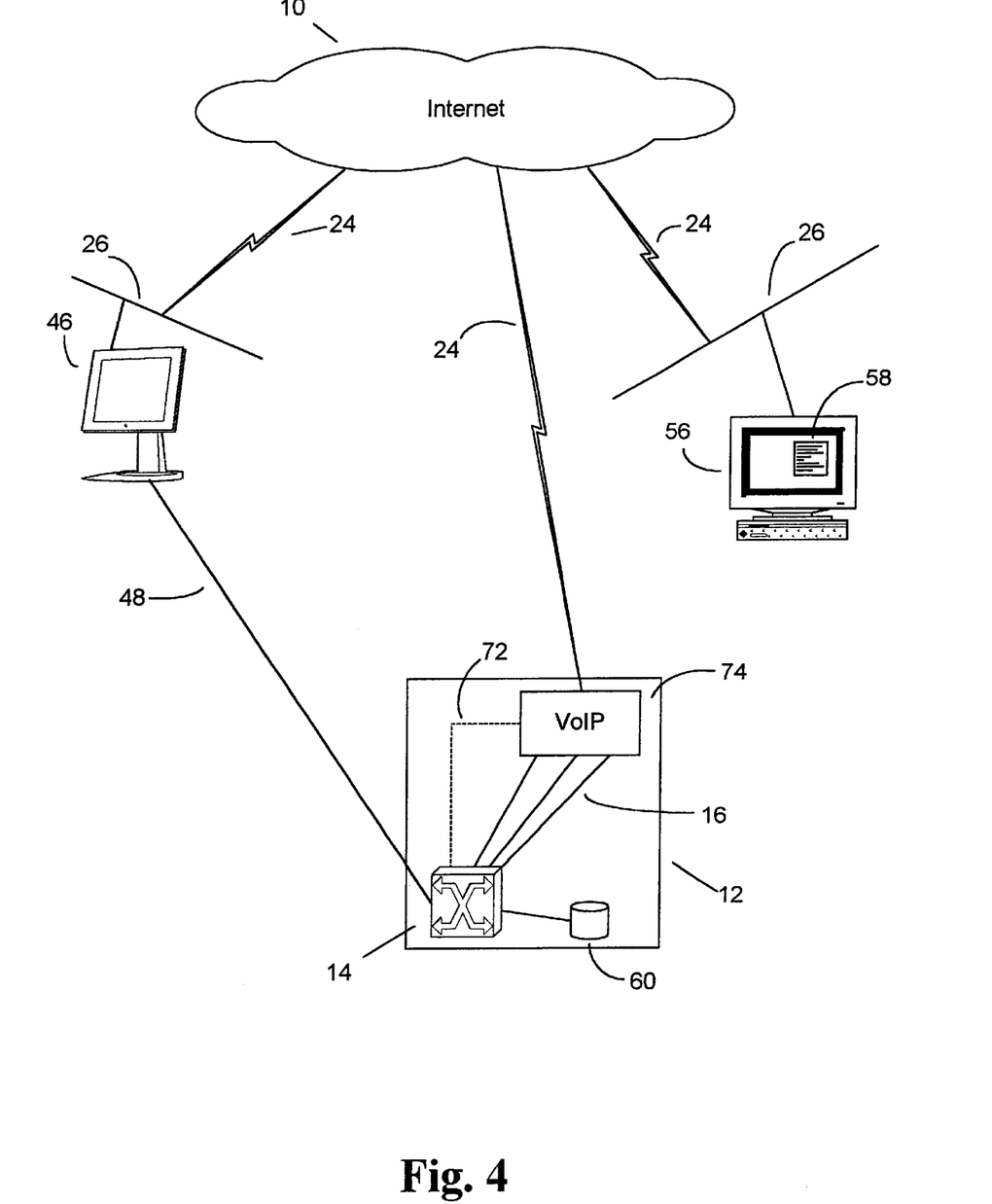
FIG. 4 is a schematic diagram depicting an Integrated Access Device in an operational setting.

Refer now to FIG. 4 where we show an Integrated Access Device 56, having control logic software application 58, and residing on a LAN 26 with access line 24 to the Internet. We also see Integrated Device 46 on a LAN 26, also with an access line 24 to the Internet. Integrated Device 46 is connected to central office 12 switching system 14 by ISDN communications link 48. The central office 12 also houses a Voice over IP (VOIP) interface device 74 having telephone lines 16 for outgoing calls from the Internet, and having a messaging communications link 72 to the switching system 14. Assume that the Integrated Access Device 56 dials the phone number for the ISDN connected Integrated Device 46 using a VoIP software application (not shown). That application will send an Internet call setup message to VoIP interface device 74 via the Internet, said call setup message to include the IP address of the caller, and the telephone number of the called device. The VoIP interface device 74 relays the call setup message to switching system 14 via messaging channel 72. The switching system 14 will forward the call setup message via ISDN link 48 to Integrated Device 46. Integrated Device 46, now having the IP address of the calling device, can initiate an Internet communication with Integrated Access Device 56. Once communication is established, the two devices can determine to transpire any or all portions of the communication over the Internet, and will use appropriate messaging to manage that and other aspects of the remaining communication.

In an optional mode of operation, switching system 14 can look up the IP address of the called Integrated Device 46 in its records system, or send a query message to Integrated Device 46 to obtain its IP address. Once having obtained the IP address of the called Integrated Device 46, switching system 14 can send a call setup response message to VoIP interface device 74 via messaging channel 72 containing the IP address of the called device. VoIP interface device 74 may then forward the call setup response message to the calling Integrated Access Device 56 via the Internet. Integrated Access Device 56, now having the IP address of the called device, may initiate an Internet communication with the called device by sending a call setup request message to it over the Internet. Once communication is established, the two devices can determine to transpire any or all portions of the communication over the Internet, and will use appropriate messaging to manage that and other aspects of the remaining communication.

The differences between an Integrated Device and an Integrated Access Device are summarized below in Table I.

TABLE I

| Function | Integrated Devices | Integrated Access Devices |
|---|---|---|
| Logic To Initiate Or Receive An Integrated Internet/Telephony Call | Both | Initiate Only |
| Internet Connectivity With IP Address | Yes | Yes |
| Telephone Line with Digital Messaging and Telephone Number | Yes | No |
| Place Calls Over PSTN | Yes | Yes, By VoIP |
| Conduct Any Or All Portions Of Communication Over Internet | Yes | Yes |

As shown by Table 1, all of the Integrated Devices incorporate the following: (i) programming logic or software applications capable of initiating and receiving an integrated Internet/telephony call; (ii) Internet connectivity with an IP address either permanently or dynamically assigned; (iii) a physical or virtual telephone line connection to the PSTN capable of carrying digital call setup messages including telephone number and IP address information, and having an associated Telephone No. (iv) compatibility with the analog PSTN to place and receive analog telephone calls; and, (v) the ability once an Internet communication has commenced to conduct any or all portions of the communication over the Internet, and to maintain or discontinue the PSTN connection as desired.

Table 1 also shows that the Integrated Access Devices incorporate the following: (i) programming logic or software applications capable of initiating an integrated Internet/telephony call; (ii) Internet connectivity with an IP address either permanently or dynamically assigned; (iii) does not have telephone line connectivity to the PSTN capable of carrying digital call setup messages (iv) compatibility with the analog PSTN to place analog telephone calls via Voice over IP arrangements; and (v) the ability once an Internet communication has commenced to conduct any or all portions of the communication over the Internet, and to maintain or discontinue the PSTN connection as desired.

Having thus described the invention in rather full detail, it will be understood that such detail need not be strictly adhered to, but that further changes and modifications may suggest themselves to one skilled in the art falling within the scope of the present invention as defined by the subjoined claims.

What is claimed is:

1. A computerized terminal device for conducting audible and visual communications over the Internet that originated as a call dialed on a PSTN, comprising:
   (a) control logic for initiating or receiving an integrated Internet and telephony call, wherein the call dialed on the PSTN is transmitted on the Internet;
   (b) Internet connectivity associated with an Internet Protocol (IP) address, or a surrogate, proxy, agent, or other substitute for said IP address, said IP address either permanently or dynamically assigned;
   (c) means for PSTN connectivity, said PSTN connectivity having an associated telephone number, and said PSTN connectivity providing means to carry digital call control messages;
   (d) digital messaging means for sending digital call control messages to the PSTN and receiving digital call control messages therefrom, said sent and received digital call control messages incorporating telephone numbers and IP addresses.

2. A device as recited by claim 1 wherein said control logic wherein said transmits any or all portions of said call over the Internet.

3. A device as recited by claim 1 which does not have a display screen for visual communications with other devices.

4. A device as recited by claim 1 wherein said digital messaging means to send and receive digital call control messages is compatible with ISDN.

5. A device as recited by claim 1 wherein said digital messaging means to send and receive digital call control messages is compatible with ADSI.

6. A device as recited by claim 1 wherein said digital messaging means to send and receive digital call control messages is compatible with the Internet Protocol.

7. A device as recited by claim 1 wherein said Internet connectivity and said PSTN connectivity are provided by wireless means.

8. A device as recited by claim 1 wherein said PSTN connectivity means is a DSL connection.

9. A device as recited by claim 8 wherein said Internet connectivity means is said DSL connection.

10. A device as recited in claim 1 wherein said PSTN connectivity means is a cable-TV connection.

11. A device as recited in claim 10 wherein said Internet connectivity means is said cable-TV connection.

12. A device as recited in claim 1 wherein said PSTN connectivity means is an ISDN connection.

13. A device as recited in claim 12 wherein said Internet connectivity means is said ISDN connection.

14. A device as recited in claim 1 further comprising means to place telephone calls to analog telephone devices and to receive telephone calls from analog telephone devices.

15. A method of operation of a computerized terminal device for conducting audible and visual communications over the Internet that originate as a call dialed on a PSTN, comprising the steps of:
   (a) sending a digital PSTN call setup request message to the PSTN by a calling device, said message to include a telephone number of a called device;
   (b) receiving a digital PSTN call setup response message from the PSTN, said response message to include the IP address of said called device; and
   (c) sending an Internet call setup request message over the Internet by said calling device to said called device, said Internet call setup request message having the IP address of said called device as the IP destination address.

16. A method of operation of a computerized terminal device for conducting audible and visual communications over the Internet that originate as a call dialed on a PSTN, comprising the steps of:
   (a) sending a digital PSTN call setup request message to the PSTN by a calling device, said message to include a telephone number of a called device;
   (b) receiving a digital PSTN call setup message from the PSTN by said called device, said message to include the IP address of said calling device; and
   (c) sending an Internet call setup request message over the Internet by said called device to said calling device, said Internet call setup request message having the IP address of said calling device as the IP destination address.

17. A method of operation of a computerized terminal device for conducting audible and visual communications over the Internet that originate as a call dialed on a PSTN, comprising the steps of:
   (a) sending a digital PSTN call setup request message to the PSTN by a calling device, said message to include a telephone number of a called device;
   (b) establishing a messaging channel by the PSTN between said calling and said called devices;
   (c) sending a message via said PSTN messaging channel containing the sending device's IP address by a first one of said calling and called devices to a second one of said calling and called devices; and
   (d) sending an Internet call setup request message over the Internet by said second one of said calling and called devices to said IP address of said first one of said calling and called devices.

18. A computerized terminal device for conducting audible and visual communications over the Internet that originated as a call dialed on a PSTN, comprising:
   (a) Internet connectivity associated with an IP address, or a surrogate, proxy, agent, or other substitute for said IP address, said IP address either permanently or dynamically assigned;
   (b) control logic for initiating an integrated Internet and telephony call, wherein the call dialed on the PSTN is transmitted on the Internet, said call being conducted using a Voice over IP arrangement; and
   (c) digital messaging means for sending and receiving digital call control messages to and from the PSTN via said Voice over IP arrangement, said sent and received call control messages incorporating telephone numbers and IP addresses.

19. A device as recited by claim 18, wherein said control logic transmits any or all portions of said calls over the Internet.

20. A device as recited by claim 19, wherein said computerized terminal device is a Personal Computer (PC), and said control logic is a software application operating on said PC.

* * * * *